US011878193B2

(12) United States Patent
Lambridis et al.

(10) Patent No.: US 11,878,193 B2
(45) Date of Patent: Jan. 23, 2024

(54) SELF-SEALING MULTI-SEGMENT RETRACTABLE FIRE CURTAIN

(71) Applicant: McKeon Rolling Steel Door Co., Inc., Bellport, NY (US)

(72) Inventors: Andrew C. Lambridis, Dix Hills, NY (US); Ashraf Gomaa, Stony Brook, NY (US); Oscar Escobar, Glendale, NY (US)

(73) Assignee: MCKEON ROLLING STEEL DOOR CO., INC., Bellport, NY (US)

( * ) Notice: Subject to any disclaimer, the term of this patent is extended or adjusted under 35 U.S.C. 154(b) by 0 days.

(21) Appl. No.: 17/394,097

(22) Filed: Aug. 4, 2021

(65) Prior Publication Data

US 2022/0040511 A1 Feb. 10, 2022

Related U.S. Application Data

(60) Provisional application No. 63/063,707, filed on Aug. 10, 2020.

(51) Int. Cl.
*E06B 9/40* (2006.01)
*A62C 2/10* (2006.01)
(Continued)

(52) U.S. Cl.
CPC ............... *A62C 2/10* (2013.01); *A47H 23/01* (2013.01); *A62C 2/247* (2013.01); (Continued)

(58) Field of Classification Search
CPC ...... A62C 2/10; A47H 23/01; A47H 2201/01; A47H 2201/02; E06B 2009/405; E06B 9/42; E06B 2009/2423; E06B 2009/2447
See application file for complete search history.

(56) References Cited

U.S. PATENT DOCUMENTS 642,423 A 1/1900 Brodie
846,709 A 3/1907 Webster
(Continued)

FOREIGN PATENT DOCUMENTS

CA 3003114 A1 * 10/2018 ............... E06B 9/42
EP 2 939 712 3/2018
(Continued)

OTHER PUBLICATIONS

Extended European Search Report dated Feb. 17, 2022.
(Continued)

*Primary Examiner* — Daniel P Cahn
*Assistant Examiner* — Jeremy C Ramsey
(74) *Attorney, Agent, or Firm* — Cozen O'Connor

(57) ABSTRACT

A multi-curtain assembly includes: first and second curtain segments, each having a leading edge and side edge; an edge fastener having first and second fastener portions proximate the side edge of the first and second curtain segments, respectively, the first fastener portion of the first curtain segment being connectable to the second fastener portion of the second curtain segment to produce a seam as the curtain segments are moved to their closed positions; a motor driving one or more of the barrel assemblies; a synchronizing mechanism synchronizing the barrel assemblies. An overlap fastener, arranged proximate edges of the curtain segments in an overlap region, has aligning portions that align as the side edges are brought into alignment by the edge fastener, to mask at least one side of the fastener seam as the fastener portions are connected to each other.

12 Claims, 10 Drawing Sheets

(51) Int. Cl.
*A47H 23/01* (2006.01)
*A62C 2/24* (2006.01)

(52) U.S. Cl.
CPC ...... *A47H 2201/01* (2013.01); *A47H 2201/02* (2013.01); *E06B 2009/405* (2013.01)

(56) References Cited

U.S. PATENT DOCUMENTS

| | | | | |
|---|---|---|---|---|
| 1,925,815 | A | 9/1933 | Nicholson | |
| 2,060,582 | A | 11/1936 | Leffert | |
| 2,140,286 | A | 12/1938 | Frazee | |
| 2,426,133 | A | 8/1947 | Willis | |
| 2,581,083 | A | 1/1952 | Percy | |
| 3,099,397 | A | 7/1963 | Abbott | |
| 3,186,473 | A | 6/1965 | Myers | |
| 3,298,197 | A | 1/1967 | Roth | |
| 3,389,738 | A | 6/1968 | Roth | |
| 3,460,602 | A | 8/1969 | Hugus | |
| 3,583,465 | A | 6/1971 | Youngs | |
| 3,853,168 | A | 12/1974 | Wrono | |
| 4,231,411 | A | 11/1980 | Hehl et al. | |
| 4,237,956 | A | 12/1980 | Sivin | |
| 4,436,137 | A | 3/1984 | Charles | |
| 4,606,157 | A | 8/1986 | Esposito | |
| 4,610,292 | A | 9/1986 | Hausmann | |
| 4,651,480 | A | 3/1987 | Kramer | |
| 4,657,059 | A | 4/1987 | Clauss | |
| 4,718,471 | A | 1/1988 | Kraeutler | |
| 4,727,919 | A | 3/1988 | Kraeuter | |
| 4,771,817 | A | 9/1988 | Angeloff | |
| 4,828,003 | A | 5/1989 | Kraeutler | |
| 4,896,714 | A | 1/1990 | Ellis | |
| 4,934,437 | A | 6/1990 | Kraeutler | |
| 5,016,701 | A | 5/1991 | Vore | |
| 5,072,767 | A | 12/1991 | Kraeutler | |
| 5,161,593 | A | 11/1992 | Hirabayashi et al. | |
| 5,632,317 | A | 5/1997 | Krupke | |
| 5,682,937 | A | 11/1997 | Decrane | |
| 5,706,876 | A | 1/1998 | Lysyj | |
| 5,819,835 | A | 10/1998 | Broome | |
| 5,862,851 | A | 1/1999 | Stoebich | |
| 6,019,156 | A | 2/2000 | Wagner | |
| 6,070,640 | A | 6/2000 | Miyagawa | |
| 6,152,207 | A | 11/2000 | Varley | |
| 6,192,960 | B1 | 2/2001 | Simon | |
| 6,257,305 | B1 | 7/2001 | Mullet | |
| 6,357,507 | B1 | 3/2002 | Stoebich et al. | |
| 6,705,378 | B1 | 3/2004 | Smidt | |
| 6,776,211 | B2 | 8/2004 | Schelcht et al. | |
| 6,962,188 | B2 | 11/2005 | Coenraets | |
| 7,051,782 | B2 | 5/2006 | Nichols, Jr. et al. | |
| 7,490,654 | B2 | 2/2009 | Gomaa | |
| 8,122,932 | B2 | 2/2012 | Cannaverde | |
| 8,164,830 | B2 | 4/2012 | Astill | |
| 8,235,086 | B2 * | 8/2012 | Smith | E06B 9/54 160/98 |
| 8,267,234 | B2 | 9/2012 | Koop et al. | |
| 8,800,632 | B2 | 8/2014 | Cooper | |
| 8,857,498 | B2 | 10/2014 | Dondlinger | |
| 8,925,617 | B2 | 1/2015 | Miller | |
| 9,279,286 | B2 | 3/2016 | Higgins et al. | |
| 9,347,258 | B2 | 5/2016 | Dwarka | |
| 9,358,861 | B2 | 6/2016 | Rockelmann | |
| 9,440,100 | B2 | 9/2016 | Lambridis | |
| 9,909,359 | B2 | 3/2018 | Bachmann | |
| 10,145,174 | B2 | 12/2018 | Gomaa et al. | |
| 10,844,657 | B2 | 11/2020 | Fleischman et al. | |
| 2002/0059985 | A1 | 5/2002 | Stoebich | |
| 2005/0087313 | A1 | 4/2005 | Nichols et al. | |
| 2009/0008039 | A1 | 1/2009 | Lambridis | |
| 2009/0266498 | A1 | 10/2009 | Cooper | |
| 2010/0294440 | A1 | 11/2010 | Li et al. | |
| 2011/0061817 | A1 | 3/2011 | Smith | |
| 2014/0262067 | A1 | 9/2014 | Higgins et al. | |
| 2014/0262084 | A1 | 9/2014 | Fleischman | |
| 2015/0300084 | A1 | 10/2015 | Schonerwald | |
| 2016/0053537 | A1 | 2/2016 | Dybdahl | |
| 2016/0375283 | A1 | 12/2016 | Lambridis | |
| 2017/0275946 | A1 | 9/2017 | Hall et al. | |
| 2017/0328129 | A1 | 11/2017 | Maertens et al. | |
| 2018/0117375 | A1 | 5/2018 | Gomaa | |
| 2018/0283100 | A1 | 10/2018 | Hall et al. | |
| 2020/0392784 | A1 * | 12/2020 | Lambridis | E06B 9/13 |
| 2021/0301592 | A1 | 9/2021 | Hebeisen et al. | |
| 2022/0040511 | A1 | 2/2022 | Lambridis et al. | |

FOREIGN PATENT DOCUMENTS

| | | | |
|---|---|---|---|
| GB | 2108839 | 5/1983 | |
| JP | H09-253229 | 9/1997 | |
| JP | 11-270255 | 10/1999 | |
| JP | 2001-193370 | 7/2001 | |
| JP | 2001-276246 | 10/2001 | |
| JP | 2002309870 A * | 10/2002 | |
| JP | 2005-188149 | 7/2005 | |
| KR | 201000135365 | 12/2010 | |
| WO | WO-2018178911 A1 * | 10/2018 | E06B 9/42 |

OTHER PUBLICATIONS

Search Report dated Nov. 9, 2020 issued in European Patent Application No. 20178981.5.
Search Report dated Dec. 23, 2021 issued in European Patent Application No. 21186004.4.
Office Action dated Sep. 10, 2021 issued in U.S. Appl. No. 16/893,815.
Office Action dated Nov. 29, 2021 issued in U.S. Appl. No. 16/893,815.
Office Action dated Sep. 22, 2022 issued in U.S. Appl. No. 17/377,070.
Office Action dated Oct. 20, 2023 issued in Canadian Patent Application No. 3,083,289.

* cited by examiner

SELF-SEALING MULTI-SEGMENT RETRACTABLE FIRE CURTAIN

CROSS-REFERENCE TO RELATED APPLICATION

This application claims benefit under 35 U.S.C. 119(e) of U.S. provisional patent application No. 63/063,707, filed Aug. 10, 2020, the entirety of which is incorporated herein by reference.

BACKGROUND OF THE INVENTION

1. Field of the Invention

The present invention relates to retractable smoke/fire curtains having multiple sections or segments so that a curtain assembly can be formed with the multiple segments. In particular, the invention pertains to an assembly having multiple-arranged retractable curtain segments and which, at adjacent edges of the multiple curtain segments, an edge fastener such as a zipper, and optionally, at an overlap portion, an overlap fastener of hook and loop or magnetic fasteners, are employed to secure the adjacent edges to each other and mask the zipper.

2. Discussion of Related Art

Existing rolling curtain assemblies may employ multiple adjacent segments of curtain, either due to a large width of an opening required to be covered, or because of a change in curtain segment orientations, such as an opening in a corner of room. It is known to have structure providing an automatic connection between two curtain edges using a zipper or other fastening mechanism, e.g., hook/loop fastener or magnets. Such systems automatically attach opposing curtain segment edges upon deployment of the curtain segments from a retracted state to an extended state, and automatically separate the segment edges when the segments are moved back to their retracted states, namely as they deploy to/from a take-up roller.

In the context of fire or smoke curtains, an extra concern is that when such connections are used to connect adjacent curtain segments, fire and/or smoke, e.g., during a fire condition, can seep through connection seams, such as through the zippered or releasably attached interface of adjacent curtain segments.

A further concern is in the attachment of the multiple curtain segments such that they can extend or retract in a synchronous manner, usually with the use of a separate motor operator for each curtain segment, with the operators being synchronously controlled to turn at the same rate.

There is, therefore, a need for a retractable curtain arrangement having multiple curtain segments using alignment and engagement of a hook/loop fastener or magnets.

SUMMARY OF THE INVENTION

The terms "fire curtain", "smoke curtain"; and "fire/smoke curtain" are used interchangeably to reference a curtain having fire and/or smoke blocking capabilities.

In accordance with a first aspect of the invention, a multi-curtain assembly having a plurality of adjacent curtain segments of a retractable curtain, positioned in a structure, includes: a first curtain segment and a second curtain segment, each curtain segment having a leading edge configured to extend between opened and closed positions by winding on and unwinding from a respective barrel assembly, and having side edges proximate to each other; an edge fastener having a first portion arranged on the side edge of the first curtain segment, and a second portion on the side edge of the second curtain segment, the first fastener portion of the first curtain segment being connectable to the second fastener portion of the second curtain segment to align the side edges with respect to each other and to produce a seam as the first and second curtain segments are moved to their closed positions along a first direction; an overlap fastener arranged proximate adjacent edges of the first and second curtain segments, the overlap fastener including, in an overlap region, aligning portions configured to align with each other as the side edges are brought into alignment by the edge fastener, and to releasably attach the aligning portions to one another, in the overlap region portions, to cause masking of at least one side of a seam of the edge fastener as the first portion and second portion of the edge fastener are connected to each other; a motor for driving one or more of the barrel assemblies; and a synchronizing mechanism configured to ensure synchronization between the barrel assemblies.

In another aspect, the multi-curtain assembly further includes an engagement mechanism positioned proximate a front side and a rear side of the curtain segments at the side edges proximate the edge fastener, and at a relative spacing with respect to the rear and front sides, the engagement mechanism causing the aligning portions of the overlap fastener in the overlap region to move towards each other as the first portion and second portion of the edge fastener are connected to each other.'

In another aspect, the synchronizing mechanism includes a curtain driving interface configured to pass along a rotational barrel driving force from the barrel assembly of the first one of said plurality of curtain segments.

In another aspect, the synchronizing mechanism is configured to synchronize plural instances of the motor for synchronous driving of plural barrel assemblies.

In another aspect, the engagement mechanism includes at least one wheel configured to apply pressure in the overlap region to the aligning portions of the overlap fastener.

In another aspect, the edge fastener includes a zipper, and wherein upon a deployment of the curtain assemblies, the zipper automatically connects adjacent edges of the curtain segments.

In another aspect, each barrel assembly includes a leveling barrel and a collector barrel, the curtain passing over the leveling barrel before being wound on the collector barrel.

In another aspect, the leading edge of each curtain segment is attached to a bottom bar.

In another aspect, the barrel assembly includes a first barrel assembly for deploying the first curtain segment and a second barrel assembly for deploying the second curtain segment.

In another aspect, the first and second barrel assemblies are deployed synchronously with each other.

In another aspect, the aligning portions of the overlap fastener include hook and loop fasteners.

In another aspect, the aligning portions of the overlap fastener include magnetic portions.

In accordance with another aspect of the invention, a retractable multi-segment curtain assembly includes an interface between a first curtain segment and an adjacent second curtain segment of a retractable curtain, positioned at an interface of the adjacent curtain segments.

The curtain segments are made of smoke and/or fire retardant material and have leading edges affixed to a bottom bar and configured to extend between opened and closed positions by winding unwinding on a barrel assembly. Each curtain segment may be optionally connectable to another curtain segment adjacent thereto by a fastener at respective adjacent edges of each curtain segment during unwinding.

In accordance with an embodiment, a curtain assembly has a plurality of adjacent curtain segments of a retractable curtain, positioned in a structure. The assembly has a first curtain segment and a second curtain segment, each curtain segment having a leading edge configured to extend between opened and closed positions by winding on and unwinding from a respective barrel assembly, and having side edges proximate to each other. An edge fastener having a first portion proximate the side edge of the first curtain segment is provided, and a second portion is proximate the side edge of the second curtain segment. The first fastener portion of the first curtain segment is connectable to the second fastener portion of the second curtain segment to align the side edges with respect to each other and to produce a seam as the first and second curtain segments are moved to their closed positions along a first direction. A motor for driving one or more of the barrel assemblies is provided, as is a synchronizing mechanism configured to ensure synchronization between the barrel assemblies. The curtain assembly further includes an overlap fastener, proximate adjacent edges of the first and second curtain segments in an overlap region, the overlap fastener including aligning portions which align with each other as the side edges are brought into alignment by the fastener, to releasably attach the overlap region portions to each other to cause masking of at least one side of the edge fastener seam as the first portion and second portion of the edge fastener are connected to each other.

In one aspect, a connecting mechanism is positioned proximate a front side and a rear side of the curtain segments at the side edges proximate the fastener, and at a relative spacing with respect to the rear and front sides, the connecting mechanism causing the aligning portions of the overlap fastener in the overlap region to move towards each other as the first portion and second portion of the edge fastener are connected to each other.

In another aspect, the curtain driving synchronizing mechanism includes a curtain driving interface configured to pass along a rotational barrel driving force from the barrel assembly of the first one of said plurality of curtain segments.

In another aspect, the connecting mechanism includes at least one wheel configured to apply pressure to the interface between the adjacent curtain segment to facilitate the masking of the seam, the edge fastener having a zipper.

In still a further aspect, engagement wheels are provided that assist in connection or engagement of the hook and loop or magnetic fasteners Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

FIGS. 1-9 show various views of a retractable multi-curtain assembly 10 that includes a first curtain segment 2A and a second curtain segment 2B and that includes a connecting mechanism such as engagement members illustrated as wheels, proximate adjacent edges of adjacent curtain segments. As shown in the figures, a fastening portion, comprising an edge fastener 50 and an overlap fastener 52, is provided so as to connect adjacent edges of the first and second curtain segments 2A and 2B. The curtain segments are made of fire retardant material and/or smoke blocking material, or of textile fabric coated with a fire and/or smoke retardant or smoke blocking material, as is known by those of ordinary skill in the art. It is noted that the curtain may consist of a single layer of coated textile. Alternatively, or in addition, one or more curtain segments may be made from a curtain having a multi-layered structure, with one or more additional textile, and/or other material, curtain layers sewn or otherwise connected together.

Figure 1:
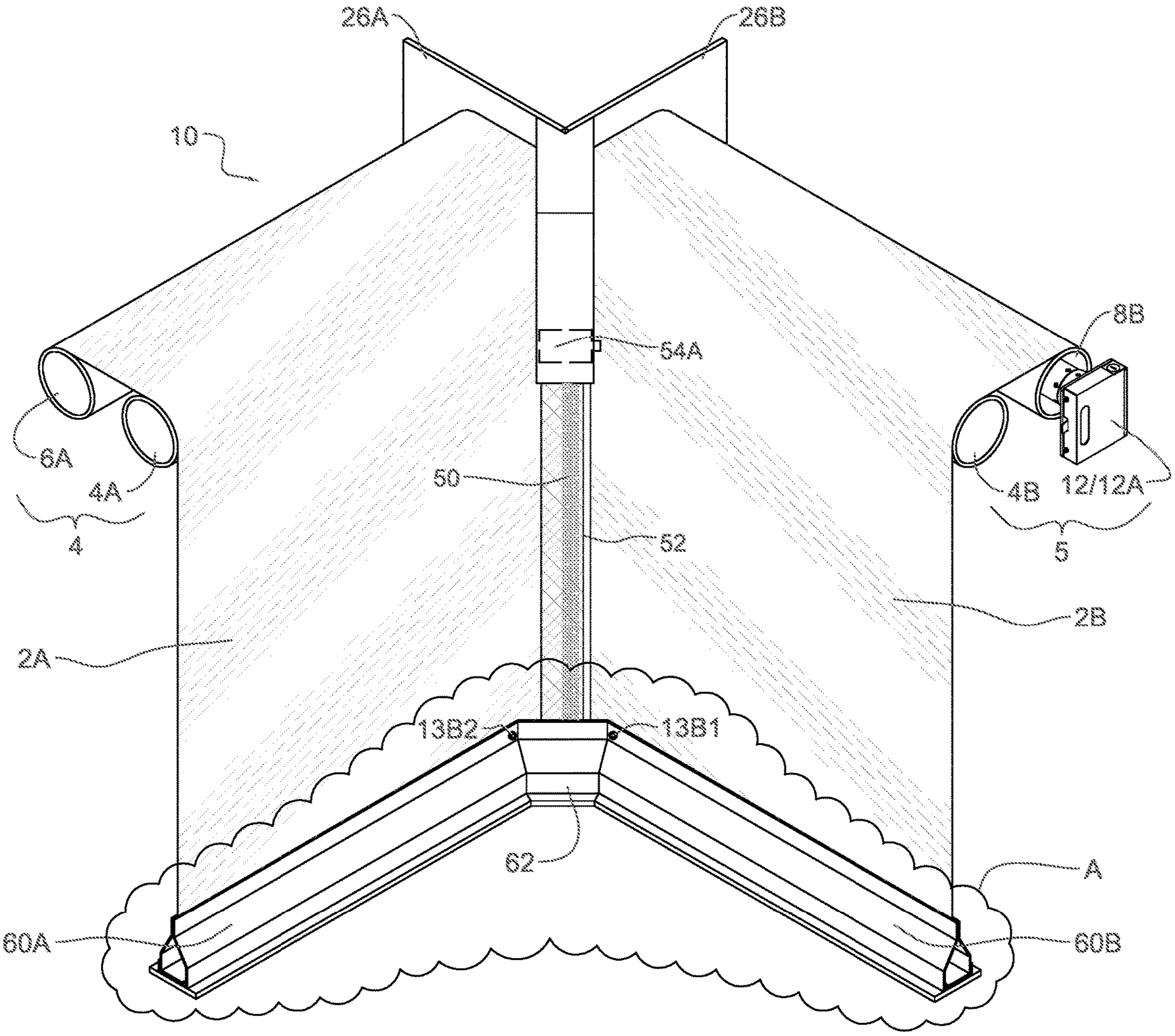
FIG. 1 is an isometric view of a retractable multi-segment curtain assembly that has a connecting mechanism in the form of engagement wheels at an interface between two curtains.

As can be seen in FIG. 1, curtain segment 2A is windable onto a first barrel assembly 4 that comprises a leveling barrel 4A, which contacts the curtain segment 2A towards the front of the assembly 10. The leveling barrel ensures that almost no sagging occurs in the curtain segment 2A is wound onto, or deployed from, the first barrel assembly 4. After passing over, in a case of winding up, the leveling barrel, the curtain is collected on a collecting barrel 6A. Use of the leveling barrel is optional and would typically be employed with larger curtain segments.

As can be seen in FIG. 1, curtain segment 2B is windable onto a second barrel assembly 5, which comprises a leveling barrel 4B, which contacts the curtain segment 2B towards the front of the assembly 10. The leveling barrel 4B ensures that almost no sagging occurs as the curtain segment 2B is wound onto, or deployed from, the second barrel assembly 5. After passing over, in a case of winding up, the leveling barrel, the curtain is collected on a collecting barrel 8B.

To maintain the orientation between the illustrated first and second curtain segments, the two barrel assemblies 4 and 5 are configured and arranged so as to wind and unwind in a synchronous manner, for example, by placement of a synchronous gearing connection between them, which would allow a single motor 12 to synchronously operate both barrel assemblies 4, 5. Alternatively, separate motor operators can be used for each curtain segment, with the motor operators working in a synchronous manner.

The curtain segments 2A and 2B have leading edges that may be fastened to a respective bottom bars 60A, 60B, such as by rivets, screws, or any other suitable manner, whereby, in an extended state, the bottom bars 60A and 60B are positioned on a floor about an opening, as shown in FIG. 1. Also as shown in the illustrated embodiment, the bottom bars are connected to each other at a corner by a bottom bar connector 62.

The curtain segments are additionally connected to one another along their respective adjacent lengths by an edge fastener 50, for example a zipper. As will be seen in the figures, the zipper is preferably zipped as the curtain segments are deployed to the extended position to cover the opening. This can be seen in a rear view of FIG. 8, to be discussed below.

To securely connect the edges of the two curtain segments 2A, 2B, each of which is windable onto respective barrel assemblies 4, 5, the edges at which the curtain segments meet one another are connected by the edge fastener 50 when the overall curtain is in an extended position. For example, the edge fastener 50 can use an automatic zipper system that forms a connected zippered seam between first and second adjacent edges of the adjacent curtain segments.

The automatic zipper system is configured to zip the adjacent edges of the curtain segments together. The curtain segments proximate the zipper contain an overlap region having releasably engageable edges, such as aligning portions of hook and loop or magnets, which are brought into alignment with each other as the zipper seam is formed so that they engage with each other, either automatically, such as via magnetic force, or by way of a connecting mechanism which presses the hook and loop portions together. This engagement allows the overlap fastener 52 to cover or overlap at least one side of the zippered seam of the edge fastener 50 to prevent or diminish smoke and/or fire seepage from one side of the curtain arrangement to the other. When the curtain segments are retracted or wound back onto their respective barrels, the zippered seam is opened, allowing each of the curtain segments to be separated and completely wound onto its respective barrel assembly.

The overlap fastener 52 is configured such that respective adjacent edges of curtain sections are provided with a strip of hooks or loops, respectively, or a strip of metal on one interface and a strip of magnetic material on an opposing interface, or two opposite pole magnetic portions, to provide for attachment and detachment of the curtain segments during deployment/retraction, to complement the attachment and detachment provided by the edge fastener 50.

Thus, embodiments of the present invention use hook and loop fasteners or magnetic fasteners in the overlap fastener 52 in conjunction with, e.g., a zipper connection of the edge fastener 50 such that the hook/loop or magnetic fasteners of the overlap fastener 52 overlap the zipper connection of the edge fastener 50 as the curtain segments are deployed. As explained above, this provides additional protection of the zippered seam to prevent smoke and fire from passing therethrough.

Figure 9:
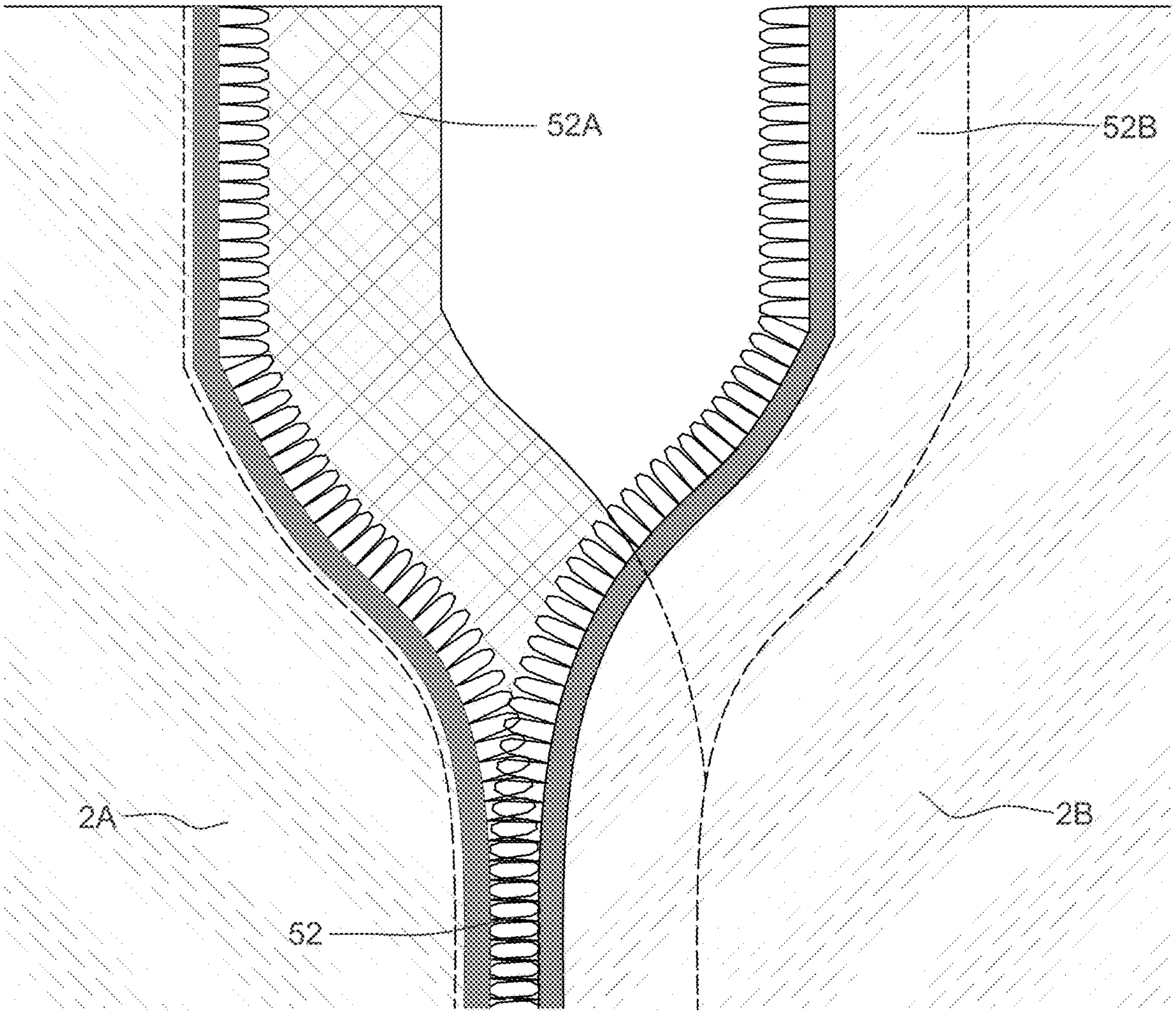
FIG. 9 is a diagram illustrating the overlapping of the zipper and the hook and loop or magnetic fasteners of the edge fastener and overlap fastener, respectively, according to an aspect of the present invention.

In this regard, the described embodiments use, for example, a pair of hook and loop engagement members, such as wheels 54A and 54B, to assist in engaging the hooks and loops of the overlap fastener 52. The front wheel 54A contacts the top of overlap fastener 52, at the front of the curtain segments, while the back wheel 54B, visible in other figures below, contacts the curtains at the back side. By pressing the edges of the curtains together in this manner, in the case in which the overlap fastener 52 comprises a hook and loop connection, a strip of loop material on one curtain segment edge will engage a strip of hook material on an adjacent curtain edge. This is shown in FIG. 9 which illustrates the front of the assembly.

It is noted that in the case that the overlap fastener 52 uses magnetic fasteners, the edges need not necessarily be pressed together, such as by the wheels or other members. Rather, the edges need only be brought into close enough contact with each other such that the magnetic force will cause sufficient attraction therebetween.

Figure 8:
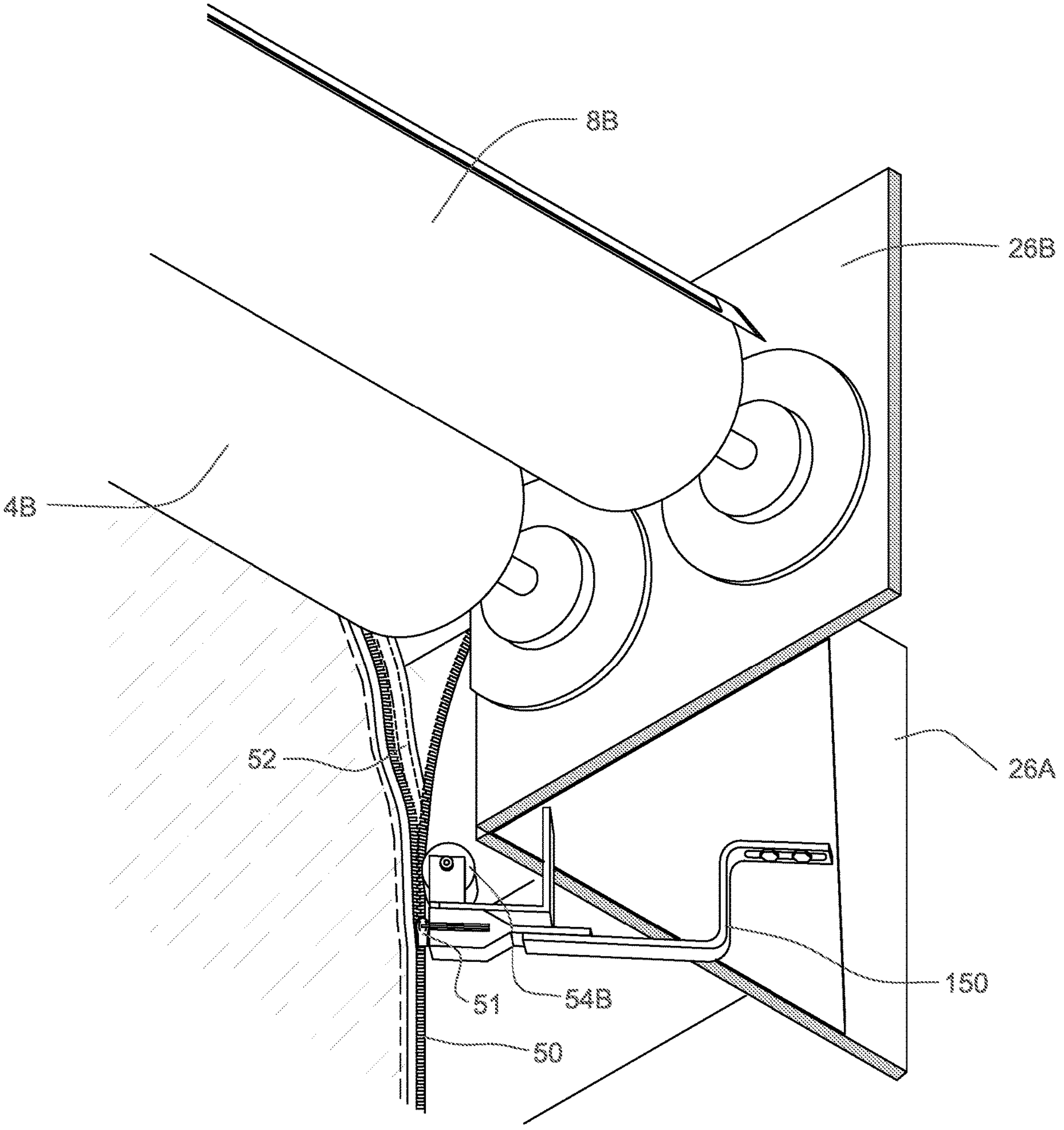
FIG. 8 is a rear perspective view of the rear engagement wheel.

As the bottom bars 60A and 60B are extended toward the floor of the opening, the zipper pull 51, held at a front portion of a mounting bracket 150, see FIG. 8, acts to close the zipper as the curtain extends towards the floor. This zipping process has the effect of pulling the curtain segments 2A and 2B together, so that the hooks and loops or magnetic fasteners of the overlap fastener 52 line up with one another. During this zipping, the wheels 54A and 54B will compress the edges of the curtains containing the hook and loop fasteners of the overlap fastener 52 to cause the edges to securely engage one another. When the curtain segments are raised, the zipper edges will disconnect from each other at the zipper pull 51 and separate as the curtain segments travel to their respective rollers. This separation causes the engaged overlap edges also to disengage from each other.

As discussed above, the bottom bar assemblies 60A and 60B are affixed to the leading edges of curtain segments 2A and 2B, respectively. In this manner, even upon a synchronous winding up (i.e., retraction) of the two curtain segments 2A and 2B, the bottom bar assemblies allow the two curtain segments to maintain their relative positions with respect to one another.

Figure 2A:
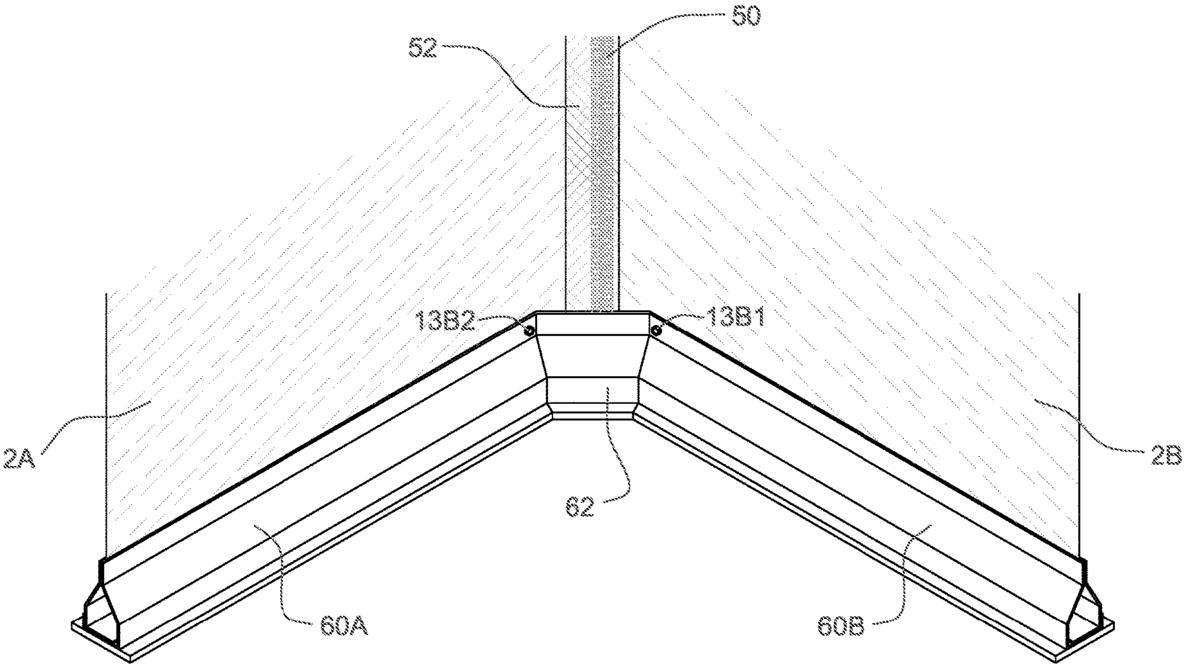
FIG. 2A is a magnified view of portion A of FIG. 1.

As can be seen in FIG. 2A, which is a magnified view of the bottom area A in FIG. 1, a corner bottom bar connector 62 is attached to the curtain segment bottoms 60A and 60B, using bolts 13B1 and 13B2. The angle of the bottom bar connector is configured to match the interface angle between the curtain segments 2A and 2B.

Figure 2B:
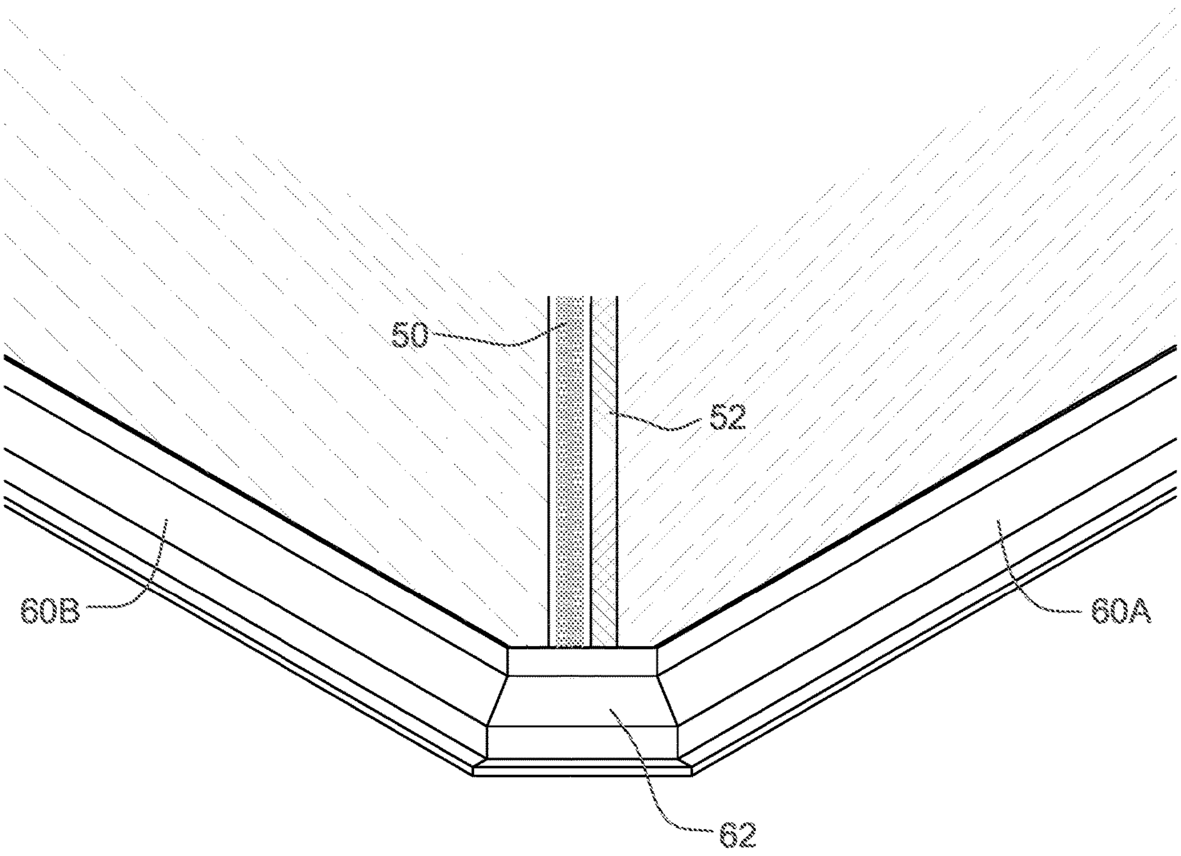
FIG. 2B is a partial isometric rear view of the area shown in FIG. 2A.

FIG. 2B is a rear view of the portion illustrated in FIG. 2A.

Figure 3:
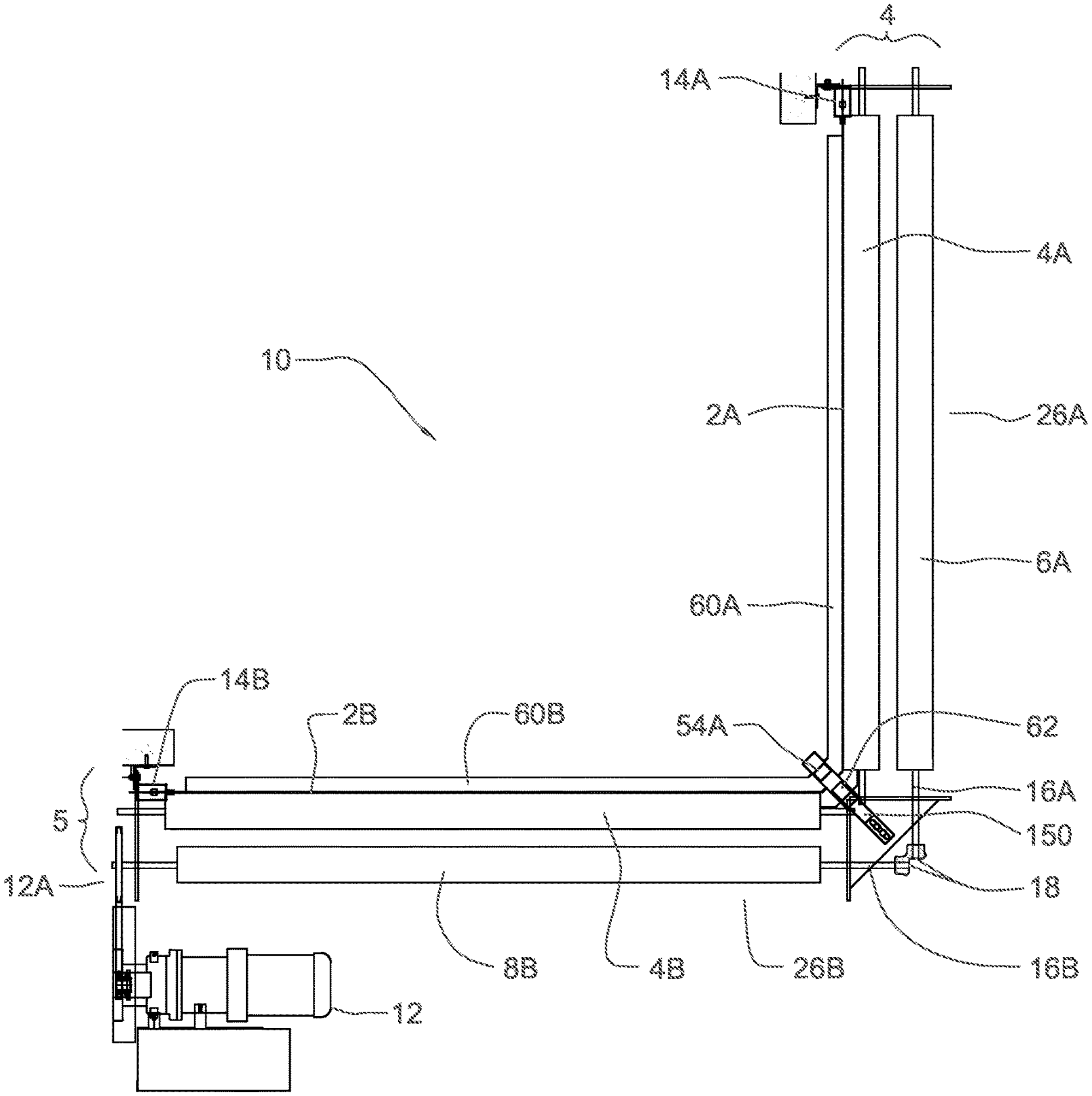
FIG. 3 is a plan view of the retractable multi-segment curtain assembly deployed at the interface between two curtains.

FIG. 3 is a plan view of the assembly 10. With reference to FIG. 3, each barrel assembly 4, 5 is arranged within a respective hood 26A, 26B, shown schematically or only partially in various figures.

As can be seen in FIG. 3, a connecting drive shaft 16A from the input collector barrel 6A is attached to a driven one of connecting gears 18. An output connecting drive shaft 16B of the collector barrel 8B is connected to a driving one of connecting gears 18. The other end of barrel 8B is driven by a motor 12, via a gearing, for example a sprocket and chain (or belt) gearing, 12A. Alternatively, as shown in FIG. 1, an inboard motor may be used, which provides a direct direction of drive, obviating the need for the sprocket and chain (or belt) gearing 12A.

Wheel 54A is visible in FIG. 3 and, as will be seen in other views discussed below, has a counterpart wheel 54B (not visible in FIG. 3) arranged at a rear side of the corner at which the curtain segments engage one another.

Figure 4:
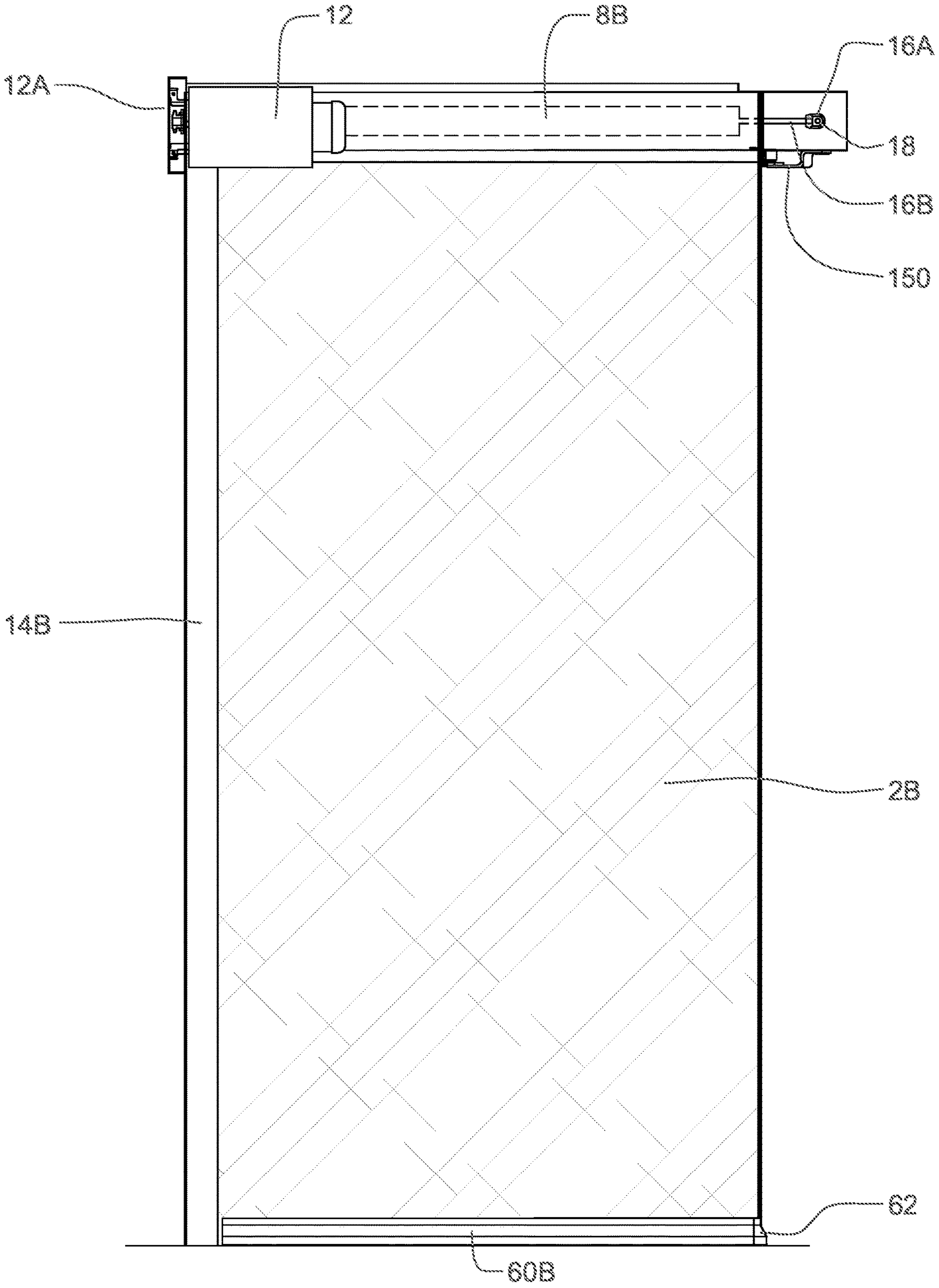
FIG. 4 is a rear elevation view of one curtain of the retractable multi-segment curtain assembly, showing the motor.

FIG. 4 is a rear elevation view of curtain segment 2B of the retractable multi-segment curtain assembly 10, showing, among other things, the motor 12 and the collector barrel 8B. The outer edge of curtain segment 2B rides in a guide assembly 14B.

Figure 5:
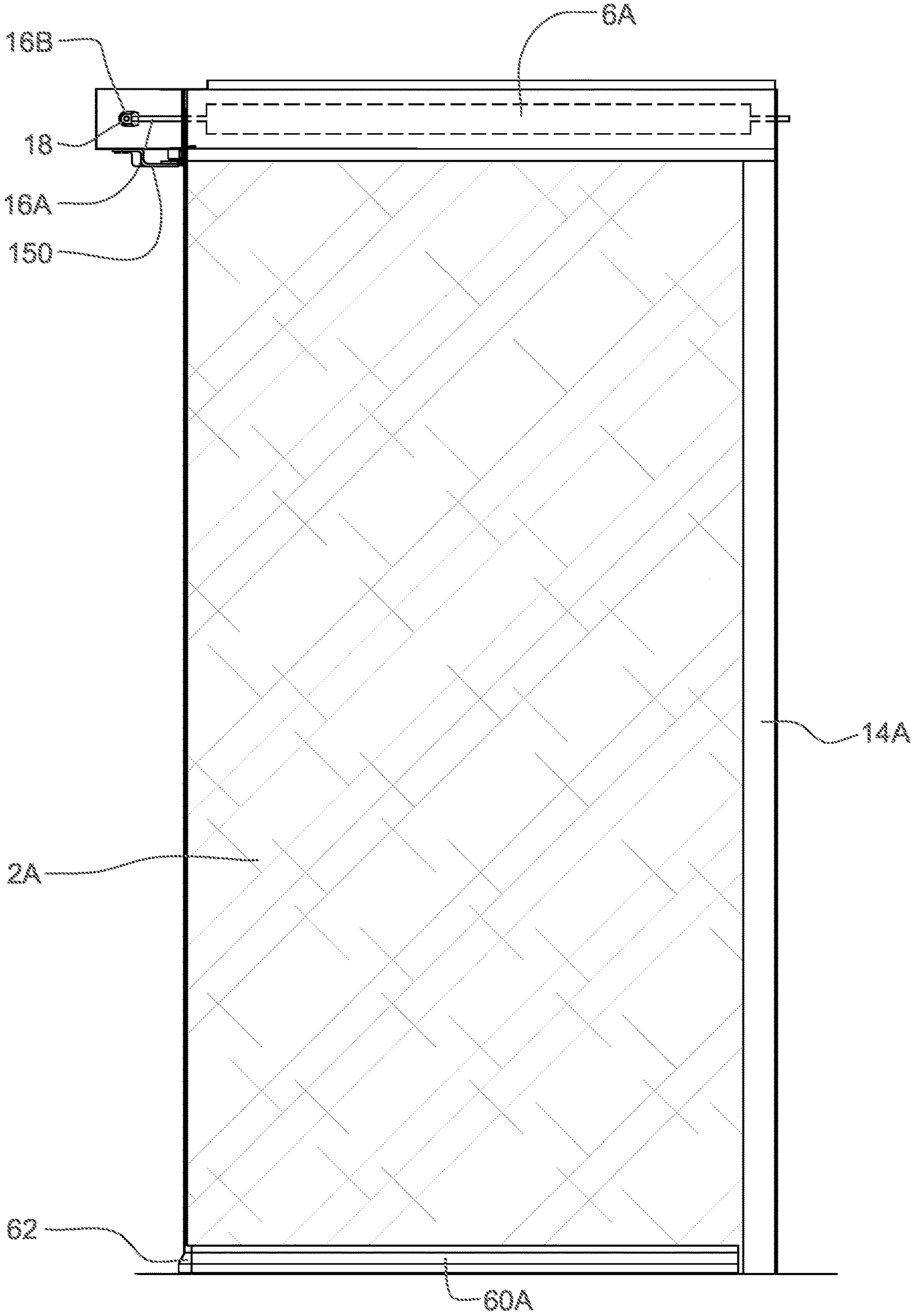
FIG. 5 is a rear elevation view of an attached adjacent curtain of the retractable multi-segment curtain assembly.

FIG. 5 is a rear elevation view of adjacent curtain segment 2A of the retractable multi-segment curtain assembly 10, showing the connecting shafts and gears 16A, 16B and 18, as well as the collector barrel 6A. The outer edge of curtain segment 2A rides in a guide assembly 14A.

Figure 6:
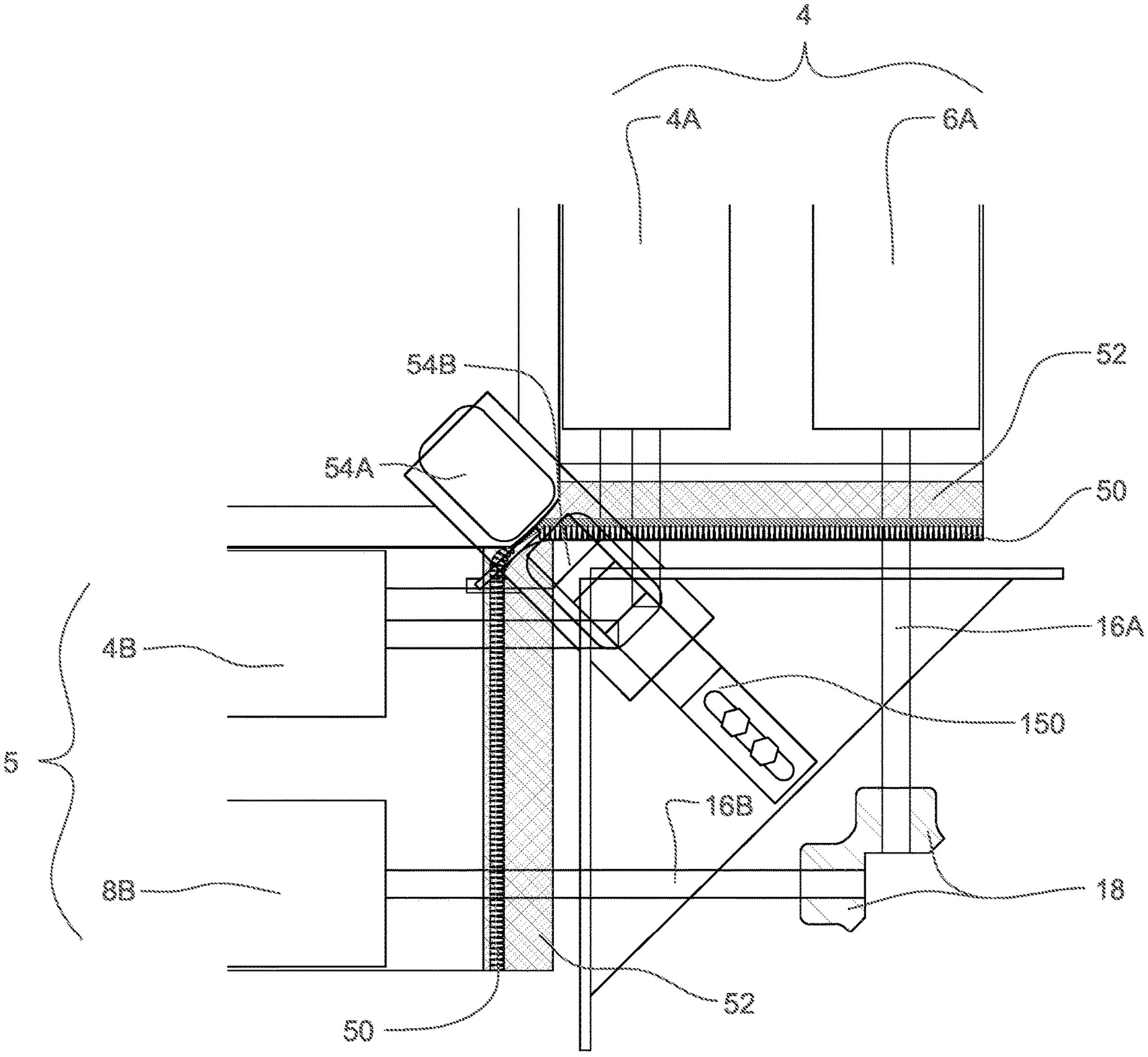
FIG. 6 is top plan view of the interface between adjacent curtains of a retractable multi-segment curtain assembly.

FIG. 6 is a top plan view of the engagement region of the retractable multi-segment curtain assembly 10, showing, among other things the front and rear engagement wheels 54A, 54B, which contact the interface between the curtain segments 2A and 2B so as to ensure a tight and secure closure of the overlap fastener 52 in relation to the edge fastener 50. As discussed previously, the closure of the edge fastener 50 lines up the overlap fastener 52.

The disclosed assembly provides for simultaneous auto zipping for two adjacent curtain segments and covering for the zipper seam of the edge fastener 50, using the hook and loop or magnetic portions of the overlap fastener. As will be discussed further below in relation to FIG. 9, in the case of the hook and loop fastener being used for the overlap fastener 52, for example, the hook fastener portion will be located on the front face of one curtain edge, and the loop fastener portion will be located on the back face of the other curtain edge (or vice versa).

Figure 7:
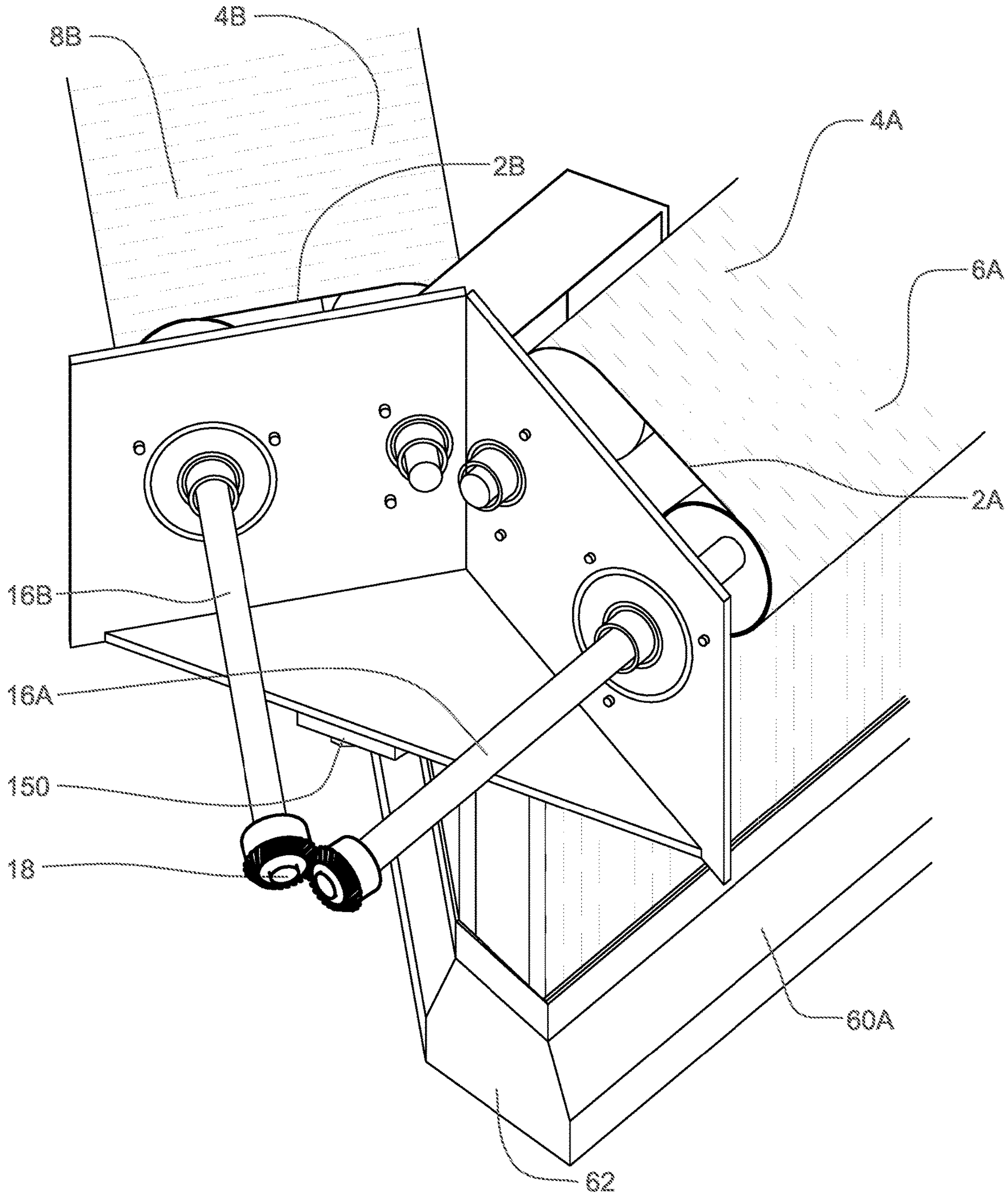
FIG. 7 is a diagram illustrating a connecting mechanism, namely. engagement wheels for an interface between two adjacent curtains.

FIG. 7 is a perspective view showing the arrangement of the wheels 54A and 54B in relation to the leveling and collector barrels.

As seen in FIG. 8, the engagement wheels 54A and 54B (only wheel 54B being visible in FIG. 8) are mounted in a mounting bracket 150, which is affixed to the point at which hoods/support brackets 26A and 26B meet one another and overlaps portions of both hoods.

FIG. 9 illustrates how, for example, a hook and loop overlap fastener 52 interacts with the zipper of the edge fastener 50 to seal the edges of curtain segments 2A and 2B.

As shown in FIG. 9, in this illustrated embodiment, the hook fastener portion 52B of the overlap fastener 52 is located on the front face of the edge of curtain segment 2B. The loop fastener portion 52A of the overlap fastener 52 is located on the back face of the edge of curtain segment 2A, such that the hook and loop sections are positioned opposite each other and ready for engagement with each other. This arrangement can, of course, be reversed.

As already explained, during zipping while the curtain segments are extended from their respective rollers, the wheels 54A and 54B will compress and align the edges of the curtains containing the hook and loop fasteners of the overlap fastener 52 together so that they engage with each other and cover the zippered seam of the edge fastener 50. This will provide a smoke and/or fire block over the zippered seam of the edge fastener 50. When the curtain segments are raised, the zipper edges will disconnect from each other at the zipper pull 51 such that, at that point, the curtain edges are only held together by the hook and loop connections. As the curtain segments continue their upward travel toward their respective barrel, the hook and loop connection will pull apart and disconnect.

It is to be understand that in the case that the overlap fastener 52 uses magnetic fastening, a similar disconnection of opposing magnetic strip portions will occur upon raising of the curtain segments.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A multi-curtain assembly having a plurality of adjacent curtain segments of retractable curtains, positioned in a structure, comprising:

a first curtain segment and a second curtain segment, each curtain segment having a leading edge configured to extend between opened and closed positions by winding on and unwinding from a respective barrel assembly, each barrel assembly being attached to a respective support bracket, and said support brackets forming an angle;

an edge fastener having a first portion and a second portion, at least one of the first and second portions arranged at a respective side edge of a respective curtain segment of the first and second curtain segments, a first portion of the first curtain segment being connectable to a second portion of the second curtain segment to align the side edges of the first and second curtain segments with respect to each other and to produce a seam as the first and second curtain segments are moved to their closed positions along a first direction;

an overlap fastener arranged proximate adjacent edges of the first and second curtain segments, the overlap fastener comprising, in an overlap region, aligning portions configured to align with each other as the side edges are brought into alignment by the edge fastener, and to releasably attach the aligning portions to one another, in the overlap region, to cause masking of at least one side of the seam of the edge fastener as the first portion and second portion of the edge fastener are connected to each other;

an edge fastener engager engageable with the first and second portions of the edge fastener and configured to connect the first and second portions of the edge fastener to each other when the first and second curtain segments move towards the closed position, and disconnect the first and second portions of the edge fastener when the first and second curtain segments move towards the open position;

at least one mounting bracket affixed to the support brackets;

an overlap fastener engager mounted on the at least one mounting bracket and positioned proximate the edge fastener engager, said overlap fastener engager being configured to engage the overlap fastener at a location on the curtain edges which is proximate a location where the edge fastener engager engages the first and second portions of the edge fastener to each other as the first and second curtain segments move toward the closed position;

a motor for driving one or more of the barrel assemblies; and a synchronizing mechanism configured to ensure synchronization between the barrel assemblies;

wherein the edge fastener engager is positioned between the overlap fastener engager and the barrel assemblies.

2. The multi-curtain assembly of claim 1, wherein the overlap fastener engager causes the aligning portions of the overlap region to move towards each other as the curtain segments move toward the closed position.

3. The multi-curtain assembly of claim 1, wherein the synchronizing mechanism comprises a curtain driving interface configured to pass along a rotational barrel driving force from the barrel assembly of the first or the second curtain segment.

4. The multi-curtain assembly of claim 1, wherein the synchronizing mechanism is configured to synchronously drive each respective barrel assembly.

5. The multi-curtain assembly of claim 2, wherein the overlap fastener engager comprises at least one wheel configured to apply pressure in the overlap region to the aligning portions of the overlap fastener.

6. The multi-curtain assembly of claim 5, wherein the edge fastener comprises a zipper.

7. The multi-curtain assembly of claim 1, wherein each barrel assembly comprises a leveling barrel and a collector barrel, the curtain passing over the leveling barrel before being wound on the collector barrel.

8. The multi-curtain assembly of claim 1, wherein the leading edge of each curtain segment is attached to a respective bottom bar.

9. The multi-curtain assembly of claim 1, wherein the barrel assemblies comprise a first barrel assembly for deploying the first curtain segment and a second barrel assembly for deploying the second curtain segment.

10. The multi-curtain assembly of claim 9, wherein the first and second barrel assemblies are deployed synchronously with each other.

11. The multi-curtain assembly of claim 1, wherein the aligning portions of the overlap fastener comprise hook and loop fasteners.

12. The multi-curtain assembly of claim 1, wherein the aligning portions of the overlap fastener comprise magnetic portions.

* * * * *